United States Patent
Cai

(10) Patent No.: US 7,616,957 B2
(45) Date of Patent: Nov. 10, 2009

(54) SYSTEMS AND METHODS FOR WIRELESS LOCATION BASED SERVICES

(75) Inventor: Zheng Cai, Fairfax, VA (US)

(73) Assignee: Nextel Communications, Inc., Reston, VA (US)

( * ) Notice: Subject to any disclaimer, the term of this patent is extended or adjusted under 35 U.S.C. 154(b) by 405 days.

(21) Appl. No.: 11/342,817

(22) Filed: Jan. 31, 2006

(65) Prior Publication Data

US 2007/0178903 A1   Aug. 2, 2007

(51) Int. Cl.
*H04W 40/00* (2009.01)
*H04W 24/00* (2009.01)

(52) U.S. Cl. ............. 455/445; 455/456.1; 455/518

(58) Field of Classification Search .............. None
See application file for complete search history.

(56) References Cited

U.S. PATENT DOCUMENTS

2006/0148503 A1*   7/2006   Lasisi et al. ............... 455/518
2006/0160544 A1*   7/2006   Sun et al. ............... 455/456.1

* cited by examiner

*Primary Examiner*—Erika A Gary

(57) ABSTRACT

Systems and methods for providing location based services are provided. Location based services can include establishing a call between mobile stations when the mobile stations are within a predetermined distance from each other. The location based services can also include providing an originating mobile station with a relative distance to a destination mobile station. The locations of the originating and destination mobile stations can be determined using a timing advance value and information used for a smart antenna array.

10 Claims, 3 Drawing Sheets

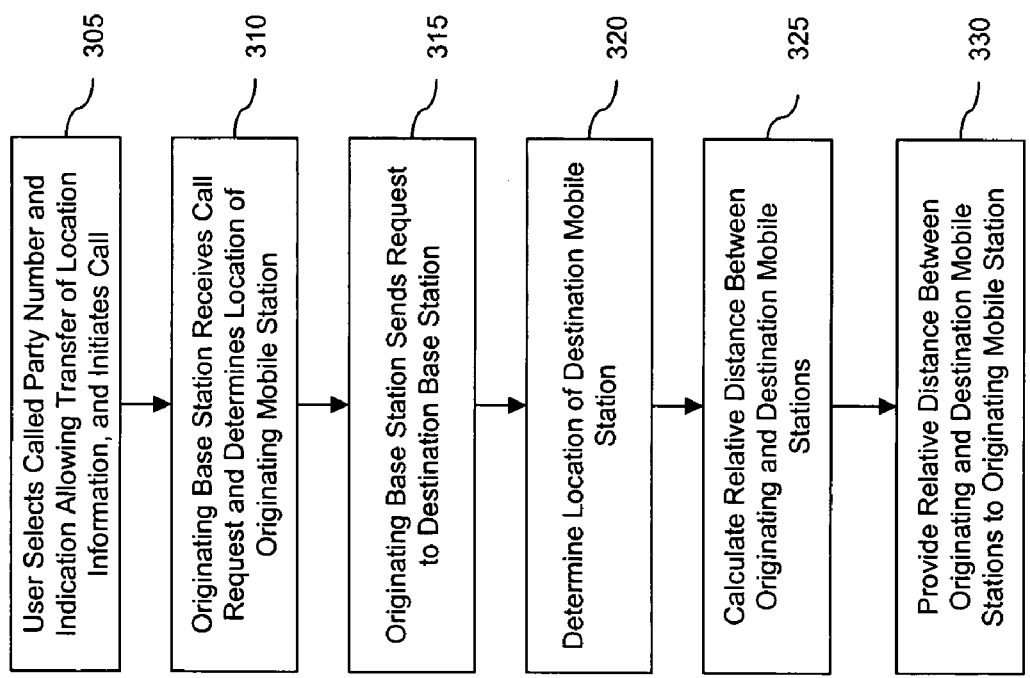

SYSTEMS AND METHODS FOR WIRELESS LOCATION BASED SERVICES

BACKGROUND OF THE INVENTION

The increased popularity of wireless communications has resulted in an increased offering of different services. One type of service currently being offered are location based services. For example, based upon a mobile station's current location, particular services can be provided. Provision of location based services necessarily requires a determination of the mobile station's current location. Conventional techniques for determining a mobile station's location include, among others, base station triangulation and mobile station global positioning satellite (GPS) receivers. Base station triangulation involves signals transmitted to or received from at least three base stations, which can be a complicated procedure. Location information using GPS receivers requires reception of information from a number of GPS satellites, which may not always be possible due to obstructions between the mobile station and the satellites.

SUMMARY OF THE INVENTION

The present invention overcomes the above-identified and other deficiencies of conventional techniques by providing systems and methods for location based services such as establishing a call between mobile stations that are within a predetermined distance of each other and providing relative location information between mobile stations. In accordance with exemplary embodiments of the present invention, the location information for the mobile stations can be determined using a timing advance value as a distance and an angle using information obtained from an adaptive antenna array. This type of information is readily available in certain systems, such as those that employ time division synchronous code division multiple access (TD-SCDMA) air interface protocols.

Other objects, advantages and novel features of the present invention will become apparent from the following detailed description of the invention when considered in conjunction with the accompanying drawings.

BRIEF DESCRIPTION OF THE DRAWING FIGURES

FIG. 3 is a flow diagram illustrating an exemplary method for providing another type of location based services in accordance with the present invention.

DETAILED DESCRIPTION OF THE PREFERRED EMBODIMENTS

Figure 1:
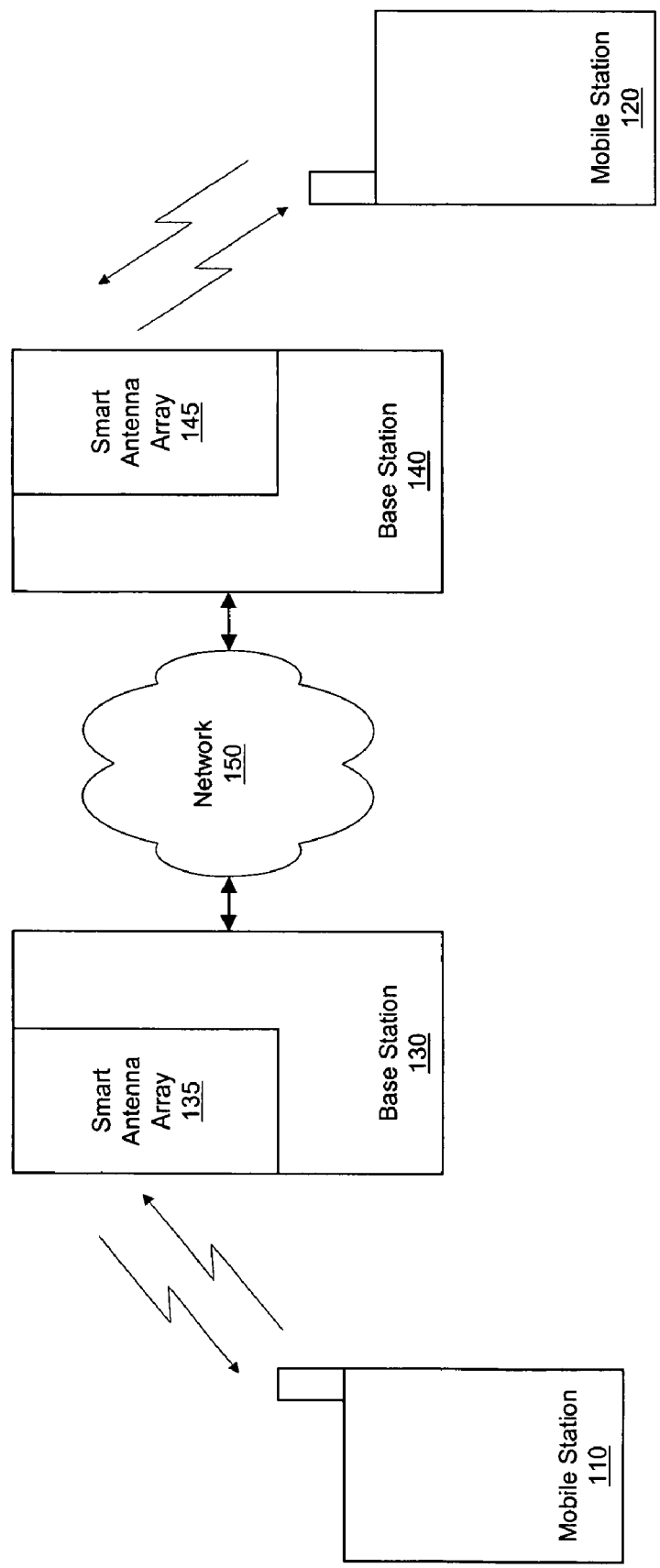
FIG. 1 is a block diagram illustrating an exemplary system in accordance with the present invention.

FIG. 1 is a block diagram illustrating an exemplary system in accordance with the present invention. The system includes an originating mobile station 110 and a destination mobile station 120. The originating mobile station 110 communicates with the destination mobile station 120 via base stations 130 and 140 and network 150. Base station 130 includes smart antenna array 135 and base station 140 includes smart antenna array 145. As is well known in the art, a smart antenna array, also commonly referred to as an adaptive antenna array, includes one or more antennas that can be selectively used for transmitting to and/or receiving from mobile stations in order to optimize use of frequency spectrum and reduce interference. The antennas of the smart antenna array that are used for transmitting to and/or receiving from a mobile station form a sector of a cell. One type of air interface protocol that employs smart antenna arrays is time division synchronous code division multiple access (TD-SCDMA). In order to maintain synchronicity between mobile station and base station transmissions in TD-SCDMA systems, a timing advance value is determined for each mobile station. Using the timing advance value, the mobile stations determine how to adjust a timing value received from the base station, and in turn, transmit in the appropriate time slot. As will be described in more detail below, the present invention employs the timing advance value and an angle between a mobile station and a base station (based on information used for configuring the smart antenna array) to determine distances between mobile stations and relative locations of mobile stations.

Figure 2:
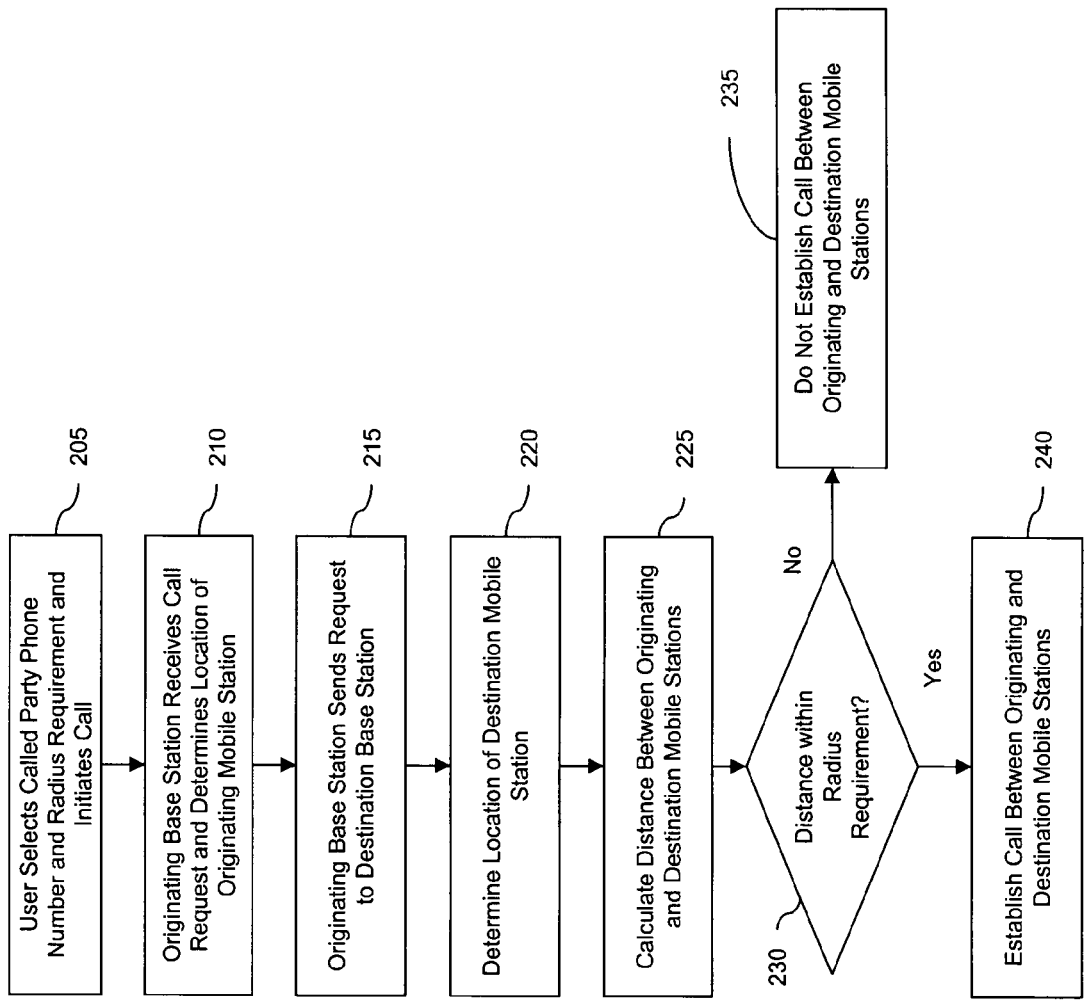
FIG. 2 is a flow diagram illustrating an exemplary method for providing one type of location based services in accordance with the present invention.

FIG. 2 is a flow diagram illustrating an exemplary method for providing one type of location based service in accordance with the present invention. This type of location based service can be establishment of a call between an originating a destination mobile station when the mobile stations are within a radius requirement set by the originating mobile station. Accordingly, a user of originating mobile station 110 selects a called party phone number and radius requirement, and initiates a call (step 205). The call can be a call request, and can include the called party phone number and radius requirement. The originating base station receives the call request and determines the location originating mobile station 110 (step 210). The location can be determined by using the smart antenna array 135 to determine an angle between base station 130 and mobile station 110, and the timing advance value to determine an absolute distance.

The originating base station 130 then sends a request to the destination base station 140 via network 150 for a location of the destination mobile station 120 (step 215). The location of the destination mobile station 120 is then determined (step 220) and a distance between the originating and destination mobile stations 110 and 120 is determined (steps 220 and 225). The location of the destination mobile station 120 can be determined by paging the destination mobile station, and using smart antenna array 145 to determine an angle between base station 140 and mobile station 120 using a response to the page. A distance can be determined using a timing advance value. The distance between originating and destination mobile stations 110 and 120 can be determined by base station 130, base station 140, destination mobile station 120 or another network entity (not illustrated). For example, if base station 140 determines the distance between mobile stations 110 and 120, then the request sent from originating base station 130 can include the location of originating mobile station 110. The calculated distance between the originating mobile station 110 and destination mobile station 120 is then compared to the radius requirement set by the originating mobile station 110. When the distance is not within the radius requirement ("No" path out of decision step 230), then the call between the mobile stations is not established (step 235). In addition, a message such as "No user within this radius is available" can be sent to the originating mobile station. When the distance is within the radius requirement ("Yes" path out of decision step 230), then the call is established between the originating and destination mobile stations (step 240). The determination of whether to establish the call can be performed by the originating base station 130, destination base station 140, destination mobile station 120 or another network entity (not illustrated). When destination mobile station 120 determines whether to establish the call, destination mobile station 120 can establish the call by responding to a traffic channel allocation in the page, and can not establish a call by not responding to such a traffic channel allocation. It should be recognized that other alternatives for establishing or not establishing a call can be implemented in connection with the present invention.

FIG. 3 is a flow diagram illustrating an exemplary method for providing another type of location based services in accordance with the present invention. This location based service is a relative distance between the originating and destination mobile stations. Accordingly, a user of originating mobile station 110 selects a called party number, provides an indication allowing transfer of location information and initiates a call (step 305). The call can be a call request and can include the called party number and indication. Originating base station 130 receives the call setup request and determines a location of originating mobile station 110 (step 310). The originating base station 130 sends the request to destination base station 140 (step 315), and then the location of destination mobile station 120 is determined (step 320). Steps 310-320 of the method illustrated in FIG. 3 can be performed in the same or in a similar manner to that described above in connection with steps 210-220 of FIG. 2.

The relative distance between the originating and destination mobile stations 110 and 120 is calculated (step 325) and provided to originating mobile station 110 (step 330). The relative distance can include a distance amount, e.g., in feet, miles, kilometers and/or the like, and an angle, e.g., north, south, east, west.

Although the calls between the originating and destination mobile stations have been described generically, these call can be interconnect voice calls, dispatch voice calls and/or data calls. Interconnect voice calls are those typically provided by most wireless carriers as circuit-switched communications. Dispatch voice calls are commonly known as walkie-talkie or push-to-talk (PTT) types of calls, such as Sprint Nextel Corporation's service identified by the trade name Direct Connect. A dispatch voice call can be a dispatch private call (between two mobile stations) or a dispatch group call (among more than two mobile stations). Establishing a call between mobile stations based upon distance can be advantageous for dispatch group calls. For example, it may be desirable to establish a dispatch group call only among members of the group that are within a predetermined area, e.g., a company's campus. Accordingly, using the present invention, the group call can be established only among those members that are within the predetermined area by limiting the radius in the call request. With regard to providing the relative distance between mobile stations, this may be used to determine whether to establish a call between the mobile stations. For example, if it is determined that the distance is too great, the user of the originating mobile station can deduce that the user of the destination mobile station is not located at work, and accordingly, may not be able to provide the information desired by the user of the originating mobile station.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for establishing a call between an originating mobile station and a destination mobile station, the method comprising:
   receiving a request to establish a call between an originating mobile station and destination mobile station by a base station that supports the originating mobile station, wherein the request includes a location of the originating mobile station and a distance parameter;
   determining a location of the destination mobile station; and
   establishing a call between the originating and destination mobile stations over a communications link that includes the base station in response to a determination that the locations of the originating and destination mobile stations are within the distance parameter.

2. The method of claim 1, further comprising the act of:
   determining a distance between the originating and destination mobile stations using the locations of the originating and destination mobile stations; and
   comparing the determined distance to the distance parameter.

3. The method of claim 2, wherein the destination mobile station determines the distance and compares the determined distance to the distance parameter.

4. The method of claim 3, wherein the act of establishing comprises the act of:
   receiving, by the destination mobile station, a traffic channel allocation.

5. The method of claim 2, wherein a base station supporting the destination mobile station determines the distance and compares the determined distance to the distance parameter.

6. The method of claim 1, wherein the act of determining the location of the destination mobile station comprises the acts of:
   determining a distance between a base station and the destination mobile station using a timing advance value; and
   determining an angle of the destination mobile station relative to the base station using information obtained from a smart antenna array.

7. The method of claim 1, wherein the destination mobile station communicates with a base station using a time division synchronous code division multiple access (TD-SCDMA) air interface protocol.

8. The method of claim 1, wherein the call request is a dispatch private call request.

9. The method of claim 1, wherein the call request is a dispatch group call request.

10. The method of claim 1, wherein the call request is an interconnect call request.

* * * * *

UNITED STATES PATENT AND TRADEMARK OFFICE
CERTIFICATE OF CORRECTION

PATENT NO.       : 7,616,957 B2                                      Page 1 of 1
APPLICATION NO.  : 11/342817
DATED            : November 10, 2009
INVENTOR(S)      : Zheng Cai It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 478 days.

Signed and Sealed this

Nineteenth Day of October, 2010

David J. Kappos
*Director of the United States Patent and Trademark Office*